US009052890B2

(12) United States Patent
Phillips et al.

(10) Patent No.: US 9,052,890 B2
(45) Date of Patent: Jun. 9, 2015

(54) EXECUTE AT COMMIT STATE UPDATE INSTRUCTIONS, APPARATUS, METHODS, AND SYSTEMS

(75) Inventors: James E. Phillips, Round Rock, TX (US); Kameswar Subramaniam, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 12/924,311

(22) Filed: Sep. 25, 2010

(65) Prior Publication Data

US 2012/0079488 A1 Mar. 29, 2012

(51) Int. Cl.
G06F 9/30 (2006.01)
G06F 9/40 (2006.01)
G06F 9/38 (2006.01)

(52) U.S. Cl.
CPC .......... *G06F 9/30087* (2013.01); *G06F 9/3857* (2013.01); *G06F 9/3842* (2013.01)

(58) Field of Classification Search
USPC ................................................ 712/216, 228
See application file for complete search history.

(56) References Cited

U.S. PATENT DOCUMENTS

| 5,265,233 | A | 11/1993 | Frailong et al. |
| 5,452,426 | A | 9/1995 | Papworth |
| 5,636,374 | A | 6/1997 | Rodgers et al. |
| 5,724,565 | A | * | 3/1998 | Dubey et al. ................... 712/245 |
| 5,826,070 | A | * | 10/1998 | Olson et al. ................... 712/222 |
| 5,898,854 | A | 4/1999 | Abramson et al. |
| 6,286,095 | B1 | 9/2001 | Morris et al. |
| 6,636,950 | B1 | 10/2003 | Mithal et al. |
| 6,643,767 | B1 | 11/2003 | Sato |
| 6,651,151 | B2 | 11/2003 | Palanca et al. |

(Continued)

FOREIGN PATENT DOCUMENTS

| JP | 10-105400 A | 4/1998 |
| WO | 2012/040708 A2 | 3/2012 |
| WO | 2012/040708 A3 | 7/2012 |

OTHER PUBLICATIONS

"PCT Search Report and Written Opinion", PCT/US2011/053266, 9 pages.

(Continued)

*Primary Examiner* — Diem Cao
(74) *Attorney, Agent, or Firm* — Vecchia Patent Agent, LLC

(57) ABSTRACT

An apparatus including an execution logic that includes circuitry to execute instructions, and an instruction execution scheduler logic coupled with the execution logic. The instruction execution scheduler logic is to receive an execute at commit state update instruction. The instruction execution scheduler logic includes at commit state update logic that is to wait to schedule the execute at commit state update instruction for execution until the execute at commit state update instruction is a next instruction to commit. Other apparatus, methods, and systems are also disclosed.

21 Claims, 7 Drawing Sheets

(56) References Cited

U.S. PATENT DOCUMENTS

| | | | |
|---|---|---|---|
| 6,678,810 B1 | 1/2004 | Palanca et al. | |
| 6,799,268 B1 | 9/2004 | Boggs | |
| 6,950,925 B1 | 9/2005 | Sander et al. | |
| 7,269,711 B2 | 9/2007 | Patel et al. | |
| 7,496,735 B2 * | 2/2009 | Yourst et al. | 712/218 |
| 7,882,339 B2 * | 2/2011 | Jacobson et al. | 712/244 |
| 2004/0044883 A1 | 3/2004 | Palanca et al. | |
| 2010/0205402 A1 * | 8/2010 | Henry et al. | 712/205 |
| 2010/0274993 A1 * | 10/2010 | Golla et al. | 712/216 |
| 2011/0078486 A1 | 3/2011 | Limaye | |
| 2013/0073835 A1 * | 3/2013 | Jacobson et al. | 712/208 |

OTHER PUBLICATIONS

Office Action of Korean Patent Application No. 10-2013-7007559, received on Apr. 3, 2014, 4 Pages of Office Action and 3 Pages of English Translation.

Office Action of Japanese Patent Application No. 2013-530397, received on Apr. 1, 2014, 7 Pages of Office Action and 5 Pages of English Translation.

International Preliminary report on Patentability received for PCT Patent Application No. PCT/US2011/053266, mailed on Apr. 4, 2013, 8 Pages.

* cited by examiner

EXECUTE AT COMMIT STATE UPDATE INSTRUCTIONS, APPARATUS, METHODS, AND SYSTEMS

BACKGROUND

1. Field

Embodiments relate to processors and other instruction processing apparatus. In particular, embodiments relate to methods, apparatus, systems, or instructions, to update internal state of processors and other instruction processing apparatus.

2. Background Information

Certain processors use pipelined execution to overlap execution phases, which may allow multiple instructions to be in different phases of execution at the same time, which may help to improve performance. The amount of parallelism achieved tends to increase as the pipeline depth increases. Over time, certain processors have incorporated deeper pipelining in an attempt to improve performance. Pipelining tends to be more effective when the instruction stream is known so that the pipeline can be kept full and the execution of a subsequent instruction does not need to await the results of those in the pipeline.

To help keep the pipeline more full, pipelined processors have used dynamic prediction (e.g., branch prediction) and speculative execution. The dynamic prediction may be used to predict the flow of instructions in the instruction stream and inject instructions of the predicted path into the pipeline. Branch prediction may involve predicting the direction of a branch, for example the direction of a conditional branch instruction, before the correct direction of the branch is definitively known. For example, the processor may make an educated guess about what direction the conditional branch instruction is most likely to take based on past history. The processor may then start executing instructions speculatively based on the assumption that the predicted branch direction is correct, but before the processor knows whether or not the predicted branch direction is actually correct.

The dynamic prediction (e.g., the predicted branch direction) will later turn out either to be correct or incorrect. If the predicted branch direction later turns out to be correct, then the results of the speculative execution may be utilized. In this case, the speculative execution offers value in greater utilization of pipeline stages that would otherwise have been dormant or at least underutilized, while waiting for the correct direction of the branch direction to be known. Alternatively, if the predicted branch direction turns out to be incorrect, or the branch direction was mispredicted, then the speculatively execution past the conditional branch instruction typically should be discarded, and the execution typically should be rewound by jumping or branching back in the control flow to the conditional branch that was mispredicted. Execution may then resume, now non-speculatively, with the now definitively known correct branch direction.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details, such as particular processor components and configurations, particular scheduling logic, and the like, are set forth. However, it is understood that embodiments of the invention may be practiced without these specific details. In other instances, well-known circuits, structures and techniques have not been shown in detail in order not to obscure the understanding of this description.

One of challenges posed by speculative execution within a processor pertains to updating or changing the internal state of the processor. Processors commonly have a large amount of internal state that should not be changed speculatively. Some processors have on the order of hundreds or thousands of bits of internal state. The internal state may include system flags, bits in control registers, and the like. During the operation of the processor, while the processor executes code, this internal state may be modified, for example by microcode of the processor and/or by software/BIOS through interfaces provided by microcode. However, typically much or most of this internal state should not be modified speculatively, for example during speculative execution. In some processors, the processor state that is most frequently modified may be renamed (for example in the case of an out-of-order processor by being allocated and renamed to a re-order buffer), which helps to protect against speculative changes to this state. However, due to the large amount of processor state in some processors, all of this processor state is generally not renamed, and the corresponding protection of the processor state through renaming is not achieved.

Embodiments of the invention pertain to a state update instruction that is operable to cause or control a processor to update internal state (e.g., non-renamed processor state) of the processor non-speculatively in a pipelined processor using speculative execution. In various embodiments, the state update instruction may cause or control the processor to update the internal state at commit (e.g., at retire or just after at retire, at complete or just after at complete, after resolution of a dynamic prediction, after receipt of a branch resolution signal, etc.). Executing the state update instruction at commit helps to provide that the internal state is not updated until after the update is known to be non-speculative. Some embodiments are applicable to out-of-order processors whereas other embodiments are applicable to in-order processors. Other embodiments pertain to methods performed responsive to the at state update instruction. Still other embodiments pertain to apparatus to process the state update instruction.

Figure 1:
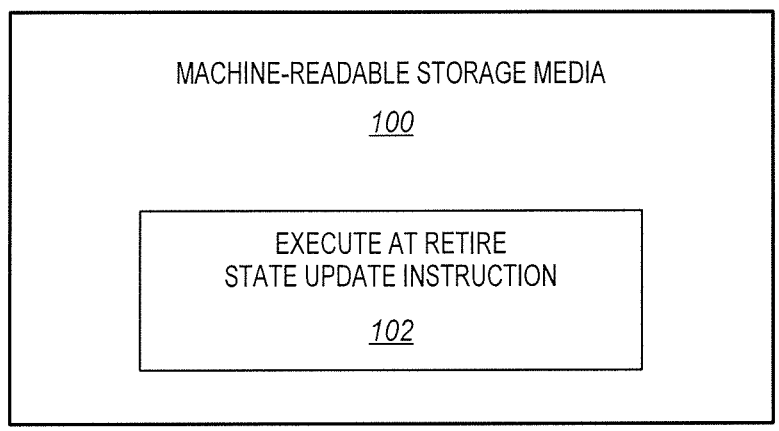
FIG. 1 is a block diagram of an embodiment of an execute at commit state update instruction stored on a machine-readable storage media.

FIG. 1 is a block diagram of an embodiment of an execute at commit state update instruction 102 stored on a machine-readable storage media 100. In various embodiments, the machine-readable storage media may be a memory (e.g., a read only memory (ROM), an instruction store, an instruction cache, an instruction queue, an instruction buffer, a disc (e.g., a magnetic or optical disc), to name just a few examples.

The execute at commit state update instruction may be provided to, accessed by, or otherwise processed by a machine, such as a processor or other instruction execution apparatus. The machine may recognize that the state update instruction is an execute at commit type of state update instruction. For example, the machine may recognize that one or more bits of the state update instruction indicate that it is an execute at commit type of instruction. There are various different ways in which this may be done. Examples of suitable ways that this may be done include, but are not limited to, providing a separate opcode for the execute at commit state update instruction, providing a tag of one or more bits in the opcode to designate that a state update instruction identified by the opcode is of an execute at commit variety, and providing a tag of one or more bits in another field of the instruction (e.g., a field that is not otherwise used for that instruction) to designate that the instruction is an execute at commit instruction, to name just a few examples.

The execute at commit state update instruction, if or when processed by the machine may cause or result in the machine waiting to schedule/issue and execute the state update instruction, until the state update instruction is the next instruction to commit, or otherwise when execution of the state update instruction is non-speculative. Then, the machine may schedule/issue, execute, and commit the state update instruction. When the state update instruction executes or in some cases commits, the internal state of the machine may be updated. The execute at commit state update instruction is operable to control the processor or other instruction processing apparatus to have the state update instruction execution occur at a particular pipeline stage, namely at commit.

In one particular example embodiment, the execute at commit state update instruction may be an execute at commit control register write instruction that is operable to write or modify a control register representing an example of a type of internal state. The contents of the control register may represent system flags, paging table locations for address translation, segmentation data, memory region types, processor modes (e.g., protection or caching), or the like. In one aspect, the control register may not be configured to be renamed through register renaming, which may make the control register or internal state even more susceptible or less protected from modification during speculative execution.

In one or more embodiments, the execute at commit state update instruction is a microinstruction. Other embodiments are not limited to micro-code controlled processors.

Advantageously, the execute at commit state update instruction may help to avoid speculative updates of internal state. Since the execute at commit state update instruction causes the machine to wait to schedule/issue and execute the state update instruction until the state update instruction is the next instruction to commit, the state update instruction will not cause an update of the internal state of the machine until after the execution of the instruction is known to not be speculative. Moreover, making the state update instruction itself an execute at commit instruction is a direct and efficient way of avoiding speculative updates of internal state. Fundamentally, it is the state update instruction that should not happen speculatively to avoid speculative modification of the internal state, not conditional microbranch instructions or other types of instructions.

Figure 2:
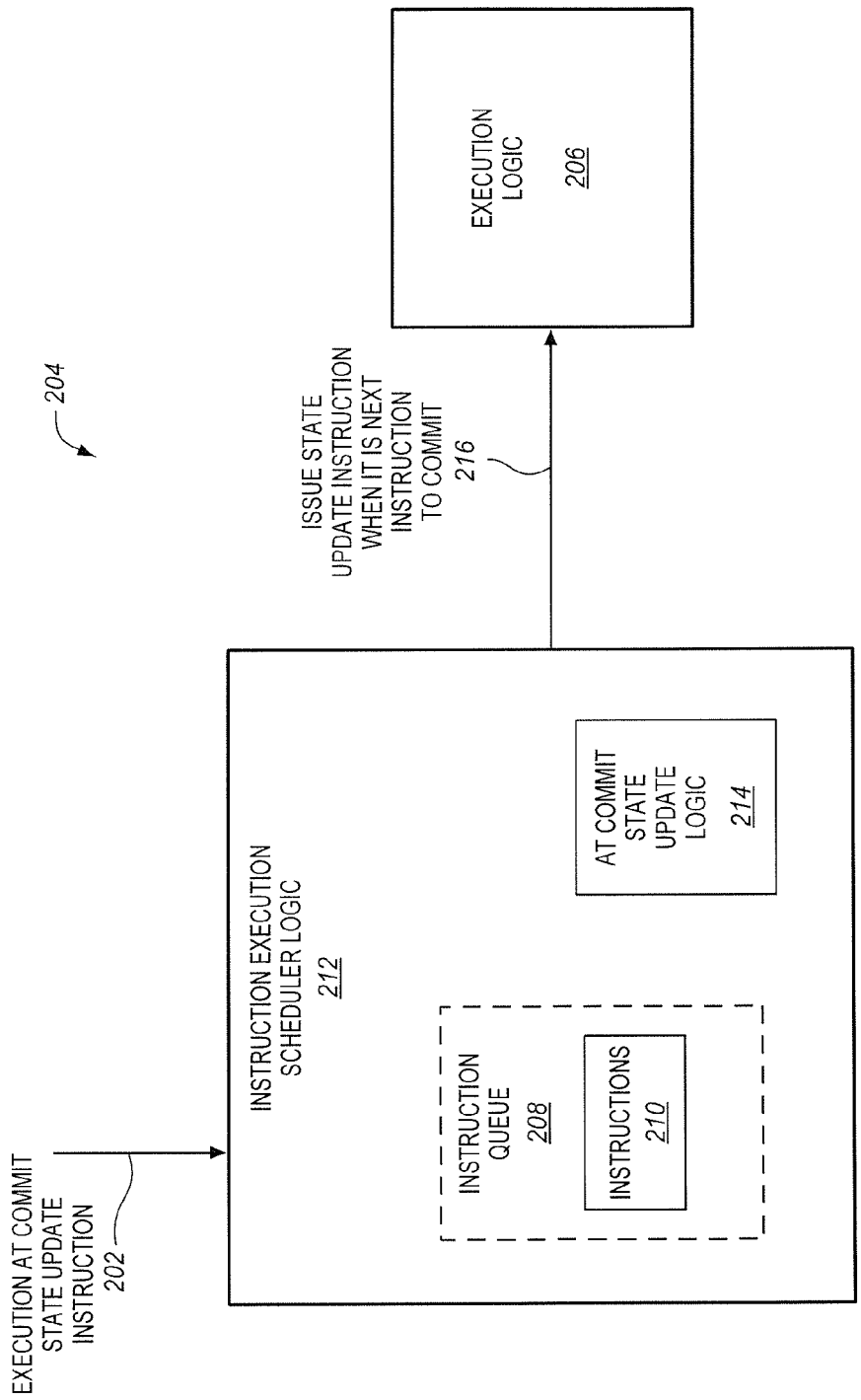
FIG. 2 is a block diagram of an embodiment of a processor or other instruction processing apparatus having an instruction execution scheduler queue to issue an execute at commit state update instruction.

FIG. 2 is a block diagram of an embodiment of a processor or other instruction processing apparatus 204 having an instruction execution scheduler logic 212 to schedule an execute at commit state update instruction 202. The processor or instruction processing apparatus may be of various types, such as, for example, various complex instruction set computing (CISC) types, various reduced instruction set computing (RISC) types, various very long instruction word (VLIW) types, and various hybrids thereof, to name just a few examples. The processor or other instruction processing apparatus may execute instructions either in-order or out-of-order.

In one or more embodiments, the processor may be a general-purpose processor, such as, for example, one of the general-purpose processors manufactured by Intel Corporation, of Santa Clara, Calif., although this is not required. A few representative examples of suitable general-purpose processors available from Intel Corporation include, but are not limited to, Intel® Atom™ Processors, Intel® Core™ processors, Intel® Core™2 processors, Intel® Pentium® processors, and Intel® Celeron® processors.

Alternatively, the processor may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors. In still other embodiments, the processor or instruction processing apparatus may represent a controller (e.g., a microcontroller), or other type of logic circuit capable of processing microcode or microinstructions.

Referring again to FIG. 2, the instruction execution scheduler logic 212 is operable to schedule or issue instructions for execution. During use the instruction execution scheduler logic 212 may receive the execute at commit state update instruction 202. As mentioned, the execute at commite state update instruction may have a tag or other indication that the instruction is an execute at commit state update instruction. In one aspect, this tag or other indication may be provided in the front end (e.g., by instruction fetch/sequencer logic). The instruction fetch/sequencer logic may include logic to specify that a particular single instruction is to be executed non-speculatively in the processor that uses speculative execution. In embodiments disclosed herein, the specification (e.g., through a tag or one or more bits of a field of the instruction) is included on a state update instruction.

The instruction execution scheduler includes an optional instruction queue 208. The optional instruction queue may be used to store instructions 210 including the execute at commit state update instruction 202. In one or more embodiments, the optional instruction queue may also store operands or other data or parameters associated with the instructions. The instruction scheduler logic is operable to schedule/issue the instructions in the instruction queue for execution. In one embodiment, the instruction scheduler logic may schedule the instructions in-order, or in another embodiment the instruction scheduler logic may schedule the instructions out-of-order.

The instruction scheduler logic includes at commit state update logic 214. The at commit state update logic is operable to wait to schedule/issue the execute at commit state update instruction for execution until the state update instruction is a next instruction to commit. The older instructions that are older than the execute at commit state update instruction may execute and commit before the execute at commit state update instruction is allowed to schedule/issue and execute. In one or more embodiments, the instruction execution scheduler logic may receive an indication of the next instruction to commit and/or an indication that execution is non-speculative from another component, such as, for example, a reorder buffer, commit logic, or branch resolution logic (e.g., a branch resolution signal). When the state update instruction is the next instruction to commit and/or non-speculative, the instruction execution scheduler logic may schedule/issue 216 the state update instruction for execution.

The execution logic 206 is coupled with the instruction execution scheduler logic. The execution logic may receive the issued state update instruction. The execution logic may include logic, such as hardware (e.g., circuitry), software, firmware, or some combination thereof, to execute the state update instruction. In one or more embodiments, the execution logic includes at least some circuitry to execute the state update instruction. For example, the circuitry may include particular/specialized circuitry responsive to the state update instruction or microinstruction.

In one or more embodiments, an execute at commit state update instruction may be withheld from scheduling/issue and execution in an out-of-order portion of a processor or other instruction processing apparatus. In one or more embodiments, an instruction execution scheduler logic may be included in an out-of-order portion of a processor or other instruction processing apparatus.

Figure 3:
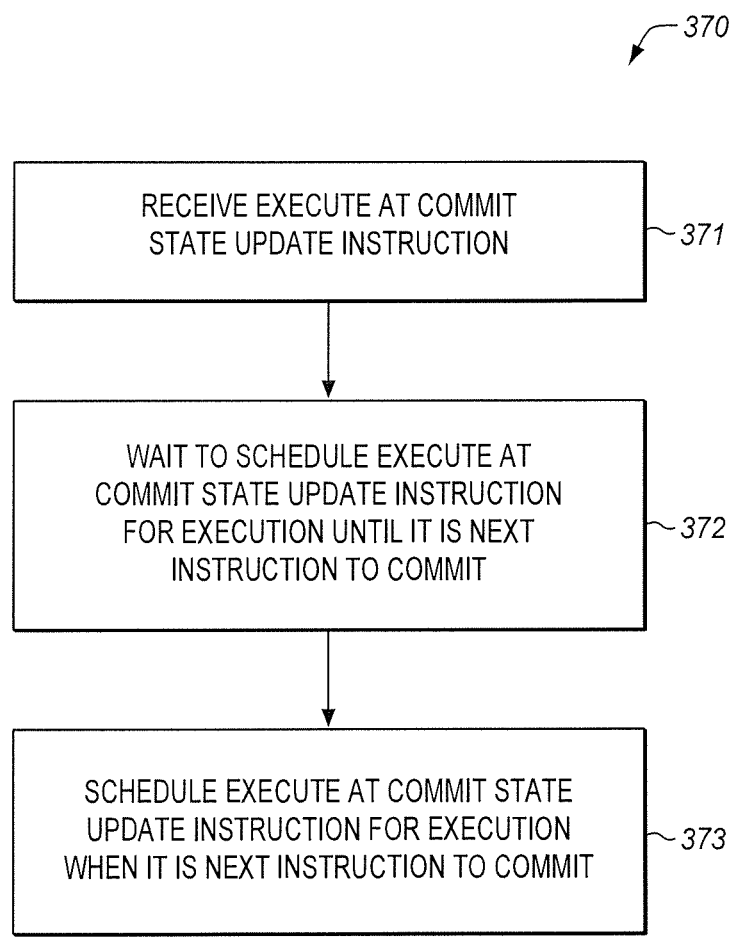
FIG. 3 is a block flow diagram of an embodiment of a method issuing an execute at commit state update instruction.

FIG. 3 is a block flow diagram of an embodiment of a method 370 of scheduling an execute at commit state update instruction. The method includes receiving the execute at commit state update instruction, at block 371. The method includes waiting to schedule the execute at commit state update instruction for execution until the execute at commit state update instruction is a next instruction to commit, at block 372. The method includes scheduling the execute at commit state update instruction for execution when it is the next instruction to commit, at block 373.

Figure 4:
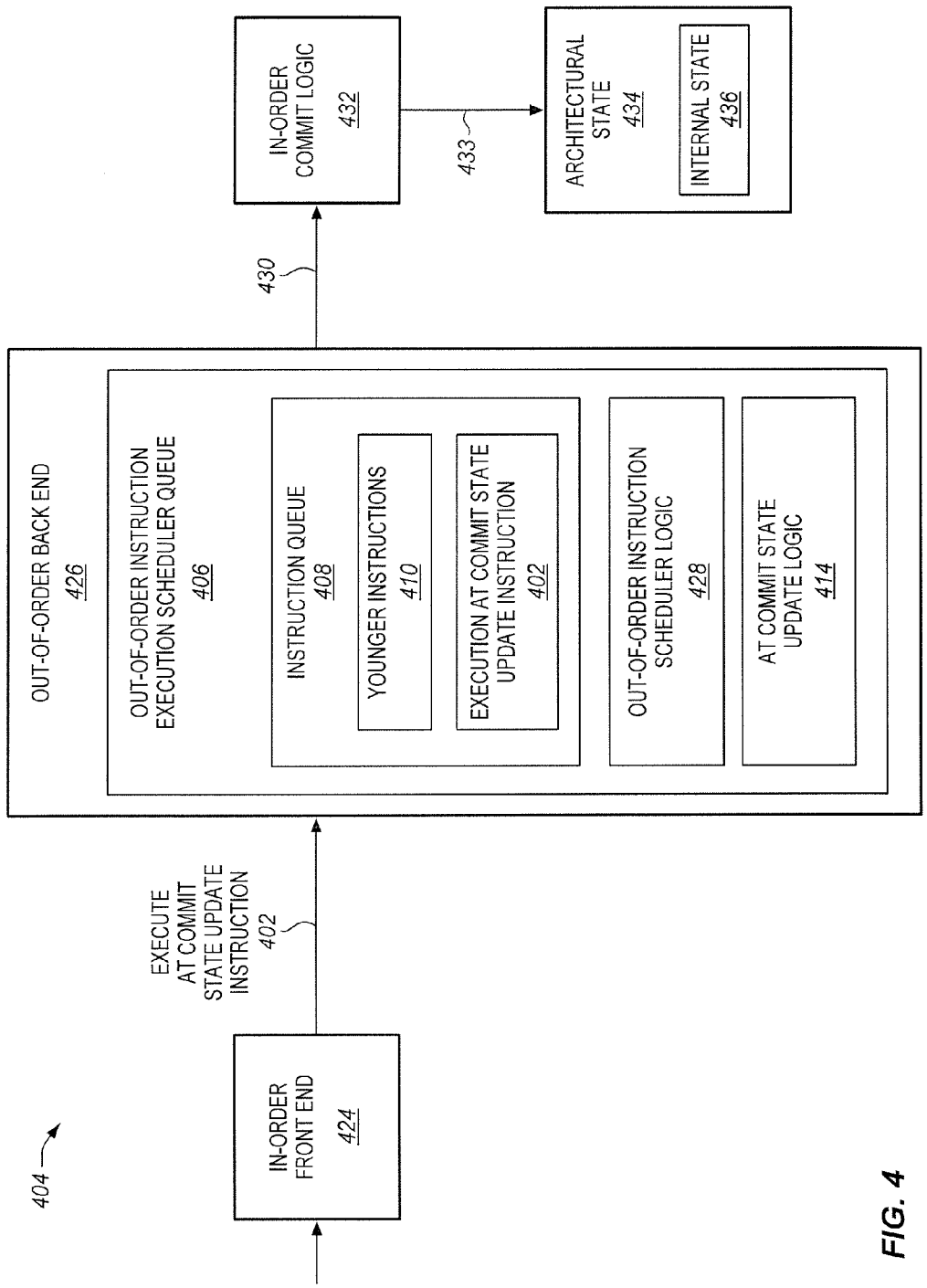
FIG. 4 is a block diagram of an embodiment of an out-of-order processor or other instruction processing apparatus having an embodiment of an out-of-order instruction execution scheduler queue to issue an execute at commit state update instruction.

FIG. 4 is a block diagram of an embodiment of an out-of-order processor or other instruction processing apparatus 404 having an embodiment of an out-of-order instruction execution scheduler queue 406. The processor or other instruction processing apparatus may be of various types, such as, for example, various complex instruction set computing (CISC) types, various reduced instruction set computing (RISC) types, various very long instruction word (VLIW) types, and various hybrids thereof, to name just a few examples.

In one or more embodiments, the processor may be a general-purpose processor, such as, for example, one of the general-purpose processors manufactured by Intel Corporation, of Santa Clara, Calif., although this is not required. A few representative examples of suitable general-purpose processors available from Intel Corporation include, but are not limited to, Intel® Atom™ Processors, Intel® Core™ processors, Intel® Core™2 processors, Intel® Pentium® processors, and Intel® Celeron® processors.

Alternatively, the processor may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors. In still other embodiments, the processor or other instruction processing apparatus may represent a controller (e.g., a microcontroller), or other type of logic circuit capable of processing microcode or microinstructions.

The processor is an on-of-order processor that is operable to execute instructions out-of-order. In some cases, a subsequent instruction may depend upon the execution of a prior instruction. The ability to execute instructions out-of-order allows the processor to fill portions of the pipeline with instructions that do not depend on the execution of a prior instruction in the pipeline, while those that are dependent on the execution of a prior instruction wait for the instruction on which they depend to finish. This may help to increase the performance of the processor. The processor, however, may present the architectural state of the processor to software or a user in original program order. To accomplish this, the out-of-order processor may include logic (e.g., a re-order buffer) to allow state from the execution of a younger instruction that has executed prior to an older instruction to be preserved until after the execution from the older instruction is available. When the execution of the older instruction becomes available, retirement logic or commit logic may be operable to control the update of the architectural state of the processor (e.g., from the re-order buffer) by updating the state in the original instruction order. The mapping of visible state to re-order buffer entries may be achieved by renaming.

Referring again to FIG. 4, the out-of-order processor or other instruction processing apparatus includes an in-order front end section or portion 424, which may process instructions in-order. Without limitation, the front end may include one or more components, such as, for example, instruction fetch/sequence logic (e.g., an instruction fetch/sequence logic or circuit, not shown), instruction decode logic (e.g., a decoder or decode circuit, not shown), and instruction dispatch logic (e.g., an instruction dispatch logic or circuit, not shown), although the scope of the invention is not limited to any known components in the front end. In one or more embodiments, logic in the front end section or portion (e.g., fetch/scheduler logic) may tag or otherwise specify that a state update instruction is of an execute at commit variety.

The out-of-order processor or apparatus also includes an out-of-order back end section or portion 426 coupled with the front end section or portion to receive instructions including the execute at commit state update instruction 402. The out-of-order back end may reorder the instructions and process the instructions out-of-order.

As shown, the out-of-order back end may include an embodiment of an out-of-order instruction execution scheduler queue 406. The out-of-order instruction execution scheduler queue may also be referred to as a dynamic instruction execution scheduler queue. The out-of-order back end may also include instruction reorder logic (e.g., a reorder buffer, not shown) and instruction execution logic (e.g., an execution logic, not shown). The instruction execution logic may execute the instructions out-of-order and provide execution results 430.

The illustrated embodiment of the out-of-order instruction execution scheduler queue includes an instruction queue 408, an out-of-order instruction scheduler logic 428, and an at commit state update logic 414. The instruction queue may be as previously described. The at commit state update logic, according to one or more embodiments, may cause the out-of-order instruction execution scheduler queue to wait to schedule the execute at commit state update instruction for execution until the state update instruction is a next instruction to commit.

The out-of-order instruction scheduler logic may schedule the instructions in the instruction queue out-of-order. In one aspect, the out-of-order instruction scheduler logic may include logic to ensure, check, or evaluate a number of factors before scheduling an instruction for execution. Representative examples of such factors include potentially that whether or not the input (e.g., a source operand) of an instruction depends on an execution result of an as-of-yet unexecuted instruction, whether or not the input of the instruction needs to be loaded from memory, and whether or not the instruction needs to wait for a busy execution logic or other resource to become available.

Advantageously, since the instruction execution scheduler queue 406 is an out-of-order instruction execution scheduler queue, is located in an out-of-order portion or section 426 of the processor, and has the out-of-order instruction scheduler logic, the out-of-order instruction execution scheduler queue is operable to schedule/issue one or more younger instructions 410 for execution before scheduling/issuing the execute at commit state update instruction 402 for execution, which is held back from scheduling/issue and execution until it is the next instruction to commit. For clarity, the younger instructions 410 are younger than the execute at commit state update instruction 402 meaning that they occur chronologically after the execute at commit state update instruction in original program order (e.g., the younger instructions would be fetched and decoded after the execute at commit state update instruction in the in-order front end).

Advantageously, allowing the younger instructions to issue and execute around the held up execute at commit state update instruction may help to avoid a bubble in execution that would otherwise tend to reduce performance. If instead the execute at commit state update instruction were held back from execution in the in-order front end portion or section of the processor, then all microinstructions younger than the execute at commit state update instruction would also typically be held back from issue and execution behind the execute at commit state update instruction. The younger microinstructions cannot get around the held back execute at commit state update instruction. The execute at commit state update instruction and all younger instructions may be held back while all instructions older than the execute at commit state update instruction traverse the pipeline, and potentially encounter latencies (e.g., due to load misses, etc.), before the execute at commit state update instruction and any younger instructions are allowed to issue and execute. This may cause a bubble in execution that may tend to reduce performance.

Referring again to FIG. 4, the out-of-order processor or apparatus also includes an in-order commit logic 432 coupled with the out-of-order back end portion or section 426 to receive the execution results 430. The in-order commit logic may reorder the execution results so that they are in-order and then commit the execution results in-order. In one aspect, the commit logic may not commit instructions until all older instructions ahead of it in original program order have committed. Committing the instructions may include writing 433 the execution results associated with the instructions in-order to the register file or other programmer-visible architectural state 434 of the processor. When an instructions results are written to of the processor, that instruction is said to have committed. In the case of the state update instructions previously discussed, the architectural state may include the internal state previously discussed (e.g., flags, control registers, etc.) In one aspect, the internal state may be updated when the state update instruction executes, before it actually commits. For example, this may be the case for non-renamed internal state. The processor may update renamed processor state at commit, but update non-renamed processor state at execution.

Figure 5:
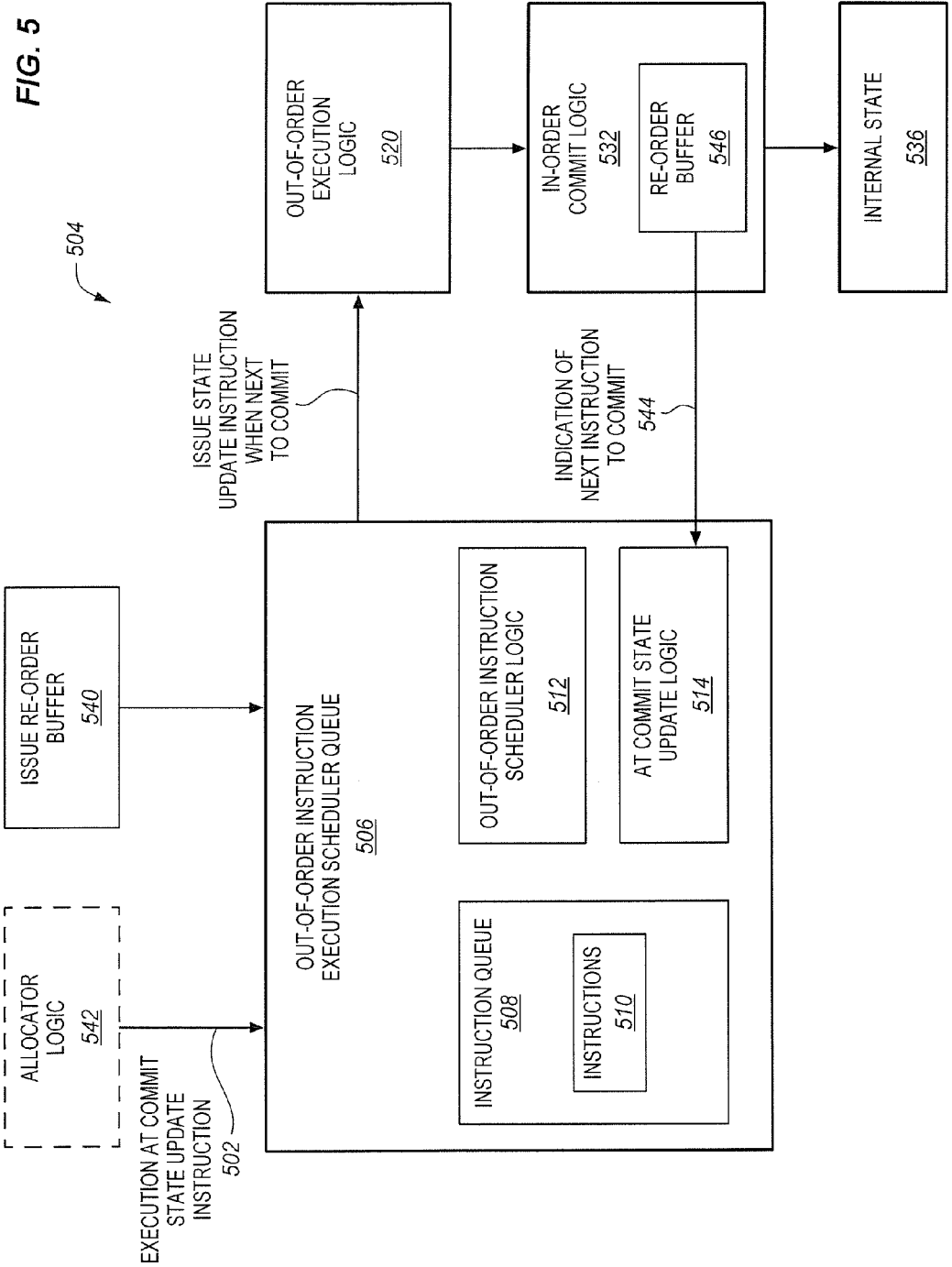
FIG. 5 is a block diagram of a particular example embodiment of an out-of-order processor or other instruction processing apparatus having a particular example embodiment of an out-of-order instruction execution scheduler queue to issue an execute at commit state update instruction.

FIG. 5 is a block diagram of a particular example embodiment of an out-of-order processor or other instruction processing apparatus 504 having a particular example embodiment of an out-of-order instruction execution scheduler queue 506 to issue an execute at commit state update instruction 502. The processor or other instruction processing apparatus may be any of the various types previously mentioned (e.g., CISC, RISC, general-purpose, special-purpose, etc.).

The processor or other apparatus includes an issue reorder buffer 540. In one or more embodiments, the issue reorder buffer may be a buffer that is coupled between an in-order front-end and execution logic. Instructions may enter the issue reorder buffer in-order, and the issue reorder buffer may store or buffer the instructions as well as information associated with the instructions, such as, for example, the instructions status, operands, and the instructions original place or location in the program order or sequence. The instructions may wait in the issue reorder buffer until data needed to execute the instructions (e.g., input operands) is available and resources needed to execute the instruction are available.

The processor or other apparatus also includes the out-of-order instruction execution scheduler queue, which is operable to receive an execute at commit state update instruction 502. As shown, in one or more embodiments, the execute at commit state update instruction may optionally be received from an allocator logic 542 of the processor, which may be coupled with the out-of-order instruction execution scheduler queue.

The out-of-order instruction execution scheduler queue includes an instruction queue 508, which as previously described may be used to store instructions including the execute at commit state update instruction. The out-of-order instruction execution scheduler queue also includes an out-of-order instruction scheduler logic 512, which as previously described may schedule the instructions for execution potentially out-of-order. The out-of-order instruction execution scheduler queue also includes an at commit state update logic 514, which as previously described in one or more embodiments may wait to schedule the state update instruction for execution until the state update instruction is a next instruction to commit. As shown, the out-of-order instruction scheduler logic may receive an indication of a next instruction to commit 544.

The processor or other apparatus also includes an out-of-order execution logic 520 coupled with the out-of-order instruction execution scheduler queue. The execution logic may receive the issued or scheduled instructions from the instruction execution scheduler queue, including the execute at commit state update instruction when it is indicated to be the next instruction to be committed. The out-of-order execution logic may include logic, in one embodiment at least some circuitry, to execute instructions in this case out-of-order.

The processor or other apparatus also includes an in-order commit logic 532 that is coupled with the out-of-order execution logic to receive execution results. As shown, in one or more embodiments, the commit logic may include a complete reorder buffer 546. The complete reorder buffer 546 and the issue reorder buffer 540 may either be the same buffer or different buffers. In one or more embodiments, the issue reorder buffer and the complete reorder buffer may be or may include a conventional or substantially conventional reorder buffer (ROB) as employed in certain out-of-order processors. In another embodiment, the reorder buffer may be replaced by a completion queue.

The complete reorder buffer may buffer the instructions and the execution results until they are ready to be committed in-order. The reorder buffer may keep track of the instructions that have executed and may assist with retiring or committing the executed instructions in-order. The complete reorder buffer may have logic to put the instructions and their associated result data coming from the out-of-order section of the processor into the same order that the instructions had in the in-order front end section of the processor. As the instruction commits it may read the result data out of the reorder buffer and write the result data to the architectural state of the processor. In the case of the execute at commit state update instructions previously discussed, the architectural state may include the internal state previously discussed (e.g., flags, control registers, etc.). In one aspect, the internal state may be updated when the state update instruction executes, before it actually commits. For example, this may be the case for non-renamed internal state. The processor may update renamed processor state at commit, but update non-renamed processor state at execution.

As shown, in one or more embodiments, the complete reorder buffer, which already tracks instructions being retired, may provide a retire pointer or other indication of the next instruction to retire 544 to the out-of-order instruction execution scheduler queue. The next instruction to retire is an example of an indication of a next instruction to commit. Other examples of indications that an instruction is ready to commit may include a complete signal or be based on a dynamic prediction resolution (e.g., a branch resolution signal), to name a few additional examples. It is also to be clarified that the concept of retirement, while shown here for an out-of-order processor, is not limited to out-of-order processors. When the execute at commit instruction is the next instruction to commit, the complete reorder buffer may provide an indication to the out-of-order instruction execution scheduler queue that the execute at commit state update instruction is the next instruction to commit. The execute at commit state update instruction may then issue, execute, commit, and update internal state 536.

When an out-of-order processor speculatively executes instructions, the speculatively executed instructions and their execution results may be stored in the reorder buffer(s) along with non-speculatively executed instructions. However, the reorder buffer(s) may keep track of the speculatively executed instructions and their execution results and prevent the speculatively executed instructions and their execution results from committing until it is confirmed that the speculative execution is confirmed/needed execution (e.g., the direction of a conditional branch instruction is confirmed to have been correctly predicted). The now confirmed/needed instructions and their execution results may then be committed and written to the architectural state. Alternatively, if the speculative execution is found to be in error and not needed (e.g., the direction of a conditional branch instruction was mispredicted), then the speculatively executed instructions and their execution results may not be committed and may not be written to the architectural state (e.g., they may be deleted from the reorder buffer(s). Advantageously, in this embodiment, by withholding the updating or changing of the processors internal state until after the reorder buffer indicates that the execute at commit state update instruction is the next instruction to commit (which includes determining that the execute at commit state update instruction is not speculative), speculative updates of internal state may be prevented or at least reduced.

Figure 6:
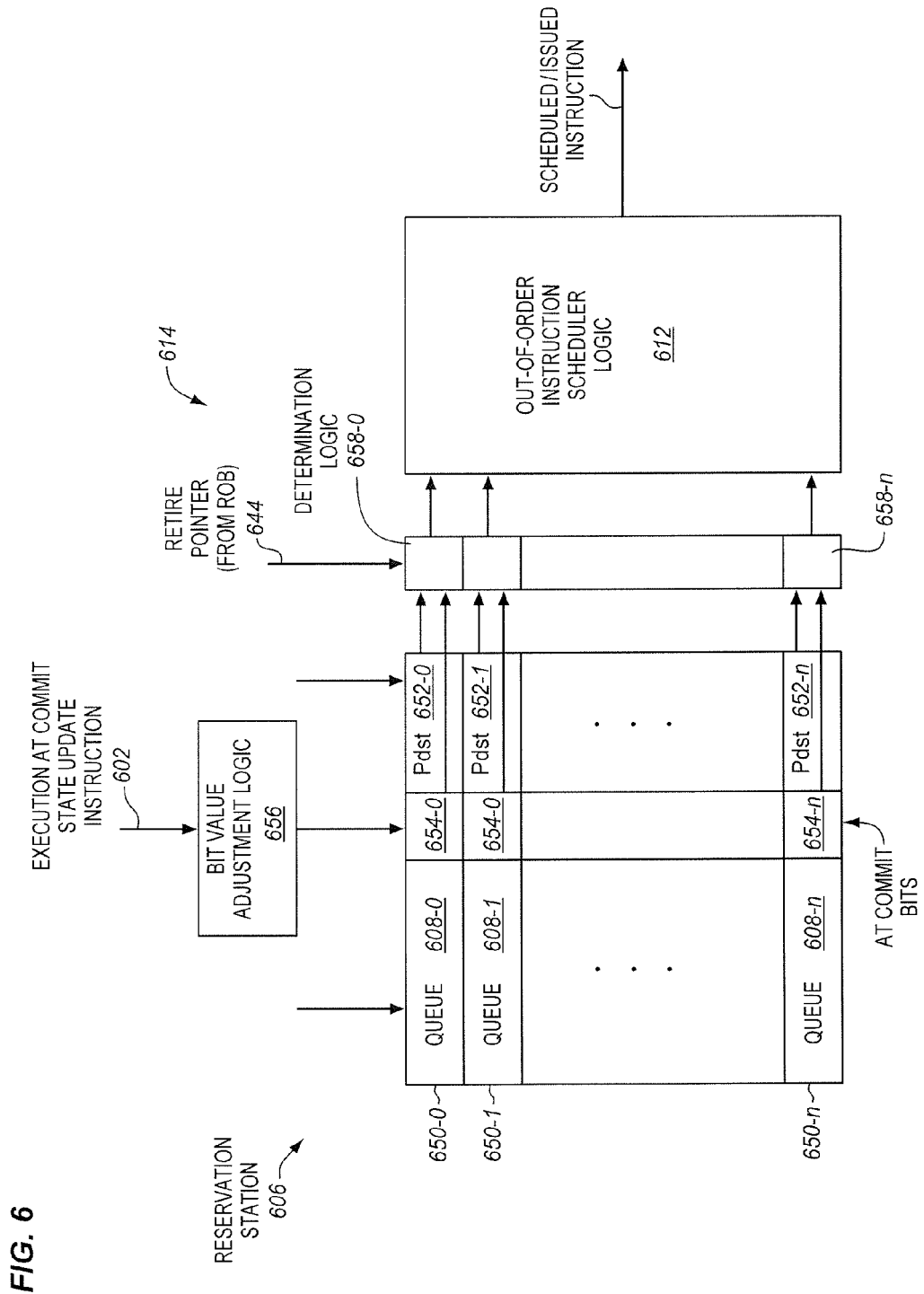
FIG. 6 is a block diagram of a particular example embodiment of a reservation station having a particular example embodiment of at commit state update logic to issue an execute at commit state update instruction.

FIG. 6 is a block diagram of a particular example embodiment of a reservation station 606 having a particular example embodiment of at commit state update logic 614 to issue an execute at commit state update instruction 602. The reservation station represents an example embodiment of an out-of-order instruction execution scheduler queue or instruction scheduling logic. Aside from the features described below or pertaining to the at commit state update logic, or the execute at commit state update instructions interactions with the reservation station, the reservation station may have other conventional or substantially conventional features. The reservation station may either be central to or shared by the execution logic of a processor, or different reservation stations may be provided for different sets of execution logic.

The reservation station has a plurality of entries 650-0 through 650-*n*, where the number n is an integer greater than two, for example from about ten to about one hundred. Each entry may have a queue 608-0 through 608-*n* to queue instructions and in some cases miscellaneous reservation station data associated with the instructions (e.g., operands associated with the instructions). In one or more embodiments, the reservation station may be operable to snoop or monitor a result bus on which data is written to registers, and the reservation station may be operable to store the data from the result bus in the queues. This may help to avoid the need to subsequently access the data from the registers.

The reservation station also has a plurality of physical destination (pdst) pointer storage locations 652-0 through 652-*n*. These locations are operable to store pointers to physical destinations or entries in a reorder buffer where the data is at for the corresponding instruction. Each instruction and each entry may have a physical destination (pdst) pointer. Each of these physical destination (pdst) pointers may represent an indication of an instruction stored at a corresponding entry in the reservation station.

The reservation station also has the at commit state update logic 614. The at commit state update logic is operable to block scheduling of the state update instruction that is tagged to execute non-speculatively and/or at commit until the state update instruction is next to retire or otherwise commit.

The at commit state update logic includes logic to associate an indication that the state update instruction should execute non-speculatively and/or at commit with the at commit state update instruction, and with the age-order of the at commit state update instruction within the instruction sequence. For example, in the illustrated embodiment, the at commit state update logic includes a plurality of sets of one or more at commit bits 654-0 through 654-*n*. Each of the sets of the one or more at commit bits corresponds to a different entry in the reservation station. The at commit state update logic also includes bit value adjustment logic 656 coupled with each of the sets of the at commit bits. The bit value adjustment logic is operable, responsive to an at commit state update instruction 602, to adjust a value of a set of one or more at commit bits, at an entry in the reservation station corresponding to the execute at commit state update instruction (e.g., at an entry where the execute at commit state update instruction is to be queued), to a given value.

By way of example, an at commit bit may either be set to the value of one (according to one convention) or cleared to a value of zero (according to another convention) responsive to the at commit state update instruction. In one or more embodiments, the at commit state update logic may include a decoder to decode an opcode of the at commit state update instruction to determine that the instruction is an at commit flavor of instruction, and then adjust the bits accordingly. The decoder may be implemented using various different types of mechanisms. Examples of suitable types of mechanisms include, but are not limited to, microcode read only memories (ROMs), look-up tables, hardware implementations, programmable logic arrays (PLAs), and the like. The decoder may be implemented in hardware (e.g., circuitry), firmware, software, or a combination thereof. It is not required that the execute at commit indication be provided through the opcode, but rather it could be provided through another field.

The at commit state update logic also includes determination logic 658. In one aspect, the determination logic may include a plurality of sets of determination logic 658-0 through 658-$n$ that each correspond to a different entry in the instruction queue. Each of the sets of the determination logic is coupled with a different corresponding one of the physical destination (pdst) pointer storage locations to receive a different one of the physical destination (pdst) pointers. Each of the sets of the determination logic is also coupled with a reorder buffer, for example, to receive a retire pointer 644 (e.g., a next to retire tail pointer), which represents an embodiment of an indication of a next instruction to retire or otherwise commit. Each of the sets of the determination logic is also coupled with a different corresponding one of the sets of one or more at commit bits to receive a different corresponding one of the sets of at commit bits.

The determination logic includes age-order comparator logic that includes logic to qualify the age-order comparison (e.g., the comparison between the retire pointer 644 with the pdst 652) with the indication via the at commit bits 654 that the state update instruction is to execute non-speculatively and/or at commit. The determination logic is operable, when the set of the one or more at commit bits at the entry in the instruction queue corresponding to the at commit state update instruction has the given value (i.e., the value it would have for an execute at commit state update instruction), to determine whether or not an indication of a next instruction to commit (e.g., the retire pointer) matches an indication of the at commit state update instruction at the entry in the instruction queue corresponding to the at commit state update instruction (e.g., the physical destination (pdst) pointer at the entry where the execute at commit state update instruction is queued). For example, a set of determination logic at an entry in the reservation station where the execute at commit state update instruction is stored, or is to be stored, may receive the one or more at commit bits for the same entry, the physical destination (pdst) pointer for the same entry, and the commit pointer, and may compare the physical destination (pdst) pointer with the retire pointer.

The reservation or scheduling logic may include logic to block the at commit state update instruction from being scheduled for execution until the microinstruction is next to commit (e.g., retire). If the physical destination (pdst) pointer does not match or equal the retire pointer, then the execute at commit state update instruction may be inferred to not be the next instruction to retire or otherwise commit, and the determination logic may continue to wait to schedule or issue the execute at commit state update instruction. For example, the determination logic may provide a blocking signal to out-of-order scheduling logic 612. This means that the execute at commit state update instruction is not yet ready to commit. The older instructions in front of the execute at commit state update instruction need to retire or otherwise commit before the execute at commit state update instruction is allowed to commit. The older instructions will be retired until the time the execute at commit state update instruction is the oldest instruction in the reservation station and is ready to retire or otherwise commit. At some point, if or when the physical destination (pdst) pointer matches or equals the retire pointer, then the execute at commit state update instruction may be inferred or determined to be the next instruction to commit, and the determination logic may determine that it is possible to schedule or issue the execute at commit state update instruction. For example, the determination logic may provide an unblocking signal or a signal that is not a blocking signal to the out-of-order scheduling logic.

In one or more embodiments, each of the sets of determination logic may include compare equal type logic, although this is not required. The compare equal logic may be implemented with exclusive OR type logic, for example. Alternatively, other types of determination or comparison logic suitable to determine whether or not the retire pointer matches or equals the physical destination (pdst) pointer may be used instead.

The out-of-order scheduling logic may receive the blocking or unblocking signals from the determination logic. When the one or more at commit bits for an entry corresponding to an execute at commit state update instruction have the given value they would be adjusted to for the execute at commit state update instruction, the out-of-order scheduling logic may not schedule the execute at commit state update instruction when a blocking signal is asserted, but may possibly schedule the execute at commit state update instruction when an unblocking signal is asserted, depending on other factors conventionally considered in out-of-order instruction scheduling (e.g., resource and/or data availability.) In one or more embodiments, the out-of-order scheduling logic may include blocking logic, ready logic, and picker logic, which aside from having to take into account the blocking/unblocking signals or aspects due to the execute at commit state update instruction, may be conventional or substantially conventional.

This is just one illustrative example embodiment. Other embodiments are contemplated that have logic to block the execution of the state update instruction differently, that use different signals besides at retire (e.g., a branch resolution signal or other at commit signal), etc.

Figure 7:
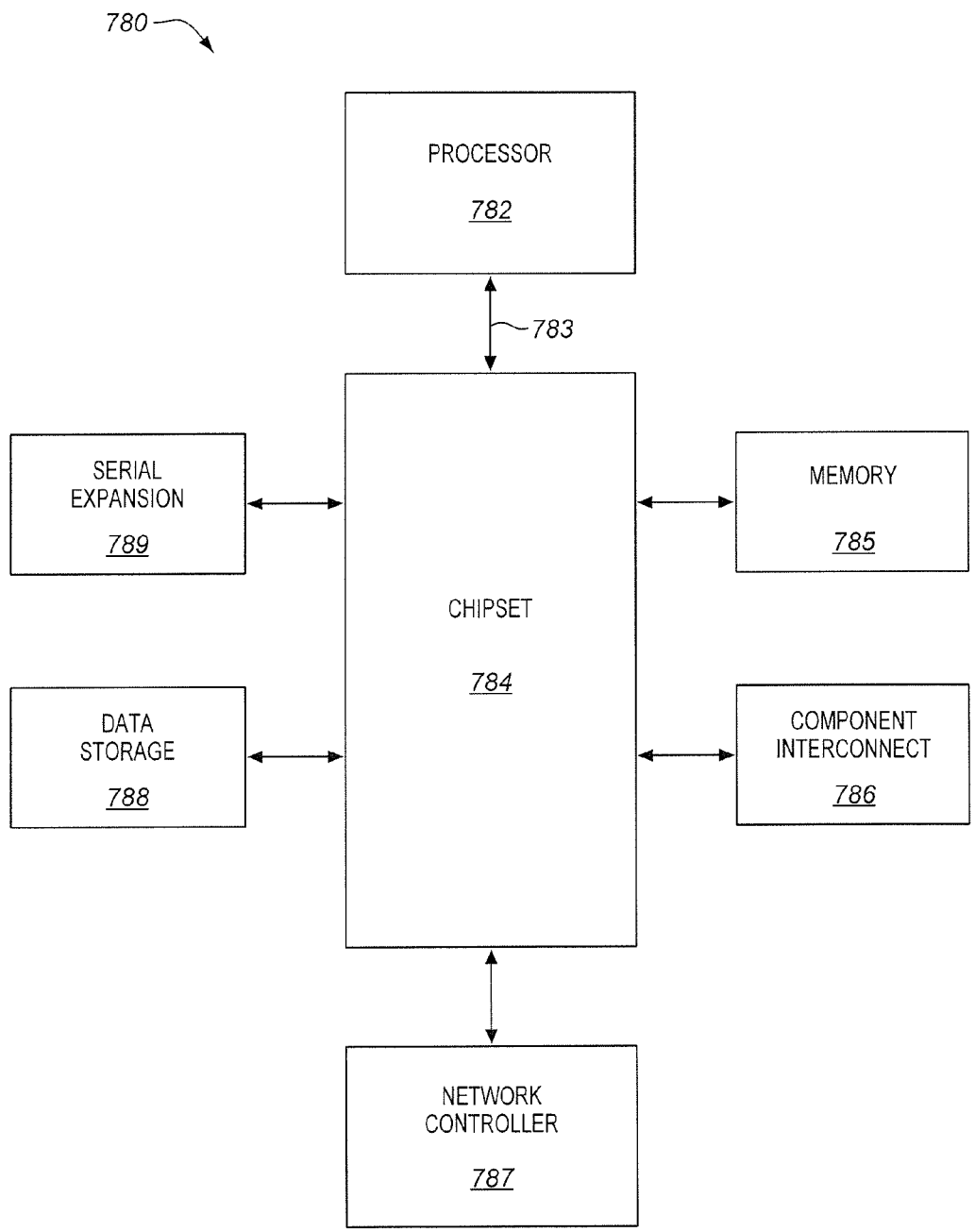
FIG. 7 is a block diagram of an example embodiment of a suitable computer system having an embodiment of a processor as disclosed herein.

Still other embodiments pertain to a system (e.g., a computer system or other electronic device) having one or more processors as disclosed herein and/or performing a method as disclosed herein. FIG. 7 is a block diagram of an example embodiment of a suitable computer system or electronic device 780.

The computer system includes a processor 782. In one or more embodiments, the processor may include microcode aliased parameter passing logic and/or microcode aliased parameter save and restore logic as disclosed elsewhere herein.

The processor may have one or more cores. In the case of a multiple core processor, the multiple cores may be monolithically integrated on a single integrated circuit (IC) chip or die. In one aspect, each core may include at least one execution unit and at least one cache. The processor may also include one or more shared caches.

In one particular embodiment, the processor may include an integrated graphics controller, an integrated video controller, and an integrated memory controller that are each monolithically integrated on a single die of the general-purpose microprocessor, although this is not required. Alternatively, some or all of these components may be located off-processor. For example, the integrated memory controller may be omitted from the processor and the chipset may have a memory controller hub (MCH).

The processor is coupled to a chipset 784 via a bus (e.g., a front side bus) or other interconnect 783. The interconnect may be used to transmit data signals between the processor and other components in the system via the chipset.

A memory 785 is coupled to the chipset. In various embodiments, the memory may include a random access memory (RAM). Dynamic RAM (DRAM) is an example of a type of RAM used in some but not all computer systems.

A component interconnect 786 is also coupled with the chipset. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

A data storage 788 is coupled to the chipset. In various embodiments, the data storage may include a hard disk drive, a floppy disk drive, a CD-ROM device, a flash memory device, a dynamic random access memory (DRAM), or the like, or a combination thereof.

A network controller 787 is also coupled to the chipset. The network controller may allow the system to be coupled with a network.

A serial expansion port 789 is also coupled with the chipset. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the chipset include, but are not limited to, an audio controller, a wireless transceiver, and a user input device (e.g., a keyboard, mouse).

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. Other system designs and configurations known in the arts for laptops, desktops, handheld PCs, personal digital assistants, engineering workstations, servers, network devices, network hubs, switches, video game devices, set-top boxes, and various other electronic devices having processors, are also suitable. In some cases, the systems may have multiple processors.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an instruction execution scheduler queue may be coupled with an execution logic through one or more intervening components.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Certain operations may be performed by hardware components, or may be embodied in machine-executable or circuit-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution logic and/or a processor may include specific or particular circuitry or other logic responsive to a instructions or microinstructions or one or more control signals derived from a machine instruction to perform certain operations.

One or more embodiments includes an article of manufacture (e.g., a computer program product) that includes a machine-accessible and/or machine-readable medium. The medium may include, a mechanism that provides, for example stores or transmits, information in a form that is accessible and/or readable by the machine. The machine-accessible and/or machine-readable medium may provide, or have stored thereon, one or more or a sequence of instructions and/or data structures that if executed by a machine causes or results in the machine performing, and/or causes the machine to perform, one or more or a portion of the operations or methods or the techniques shown in the figures disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

In another embodiment, the machine-readable media may include a non-tangible transitory machine-readable communication medium. For example, the transitory machine-readable communication medium may include electrical, optical, acoustical or other forms of propagated signals, such as carrier waves, infrared signals, digital signals, etc.)

Examples of suitable machines include, but are not limited to, computer systems, desktops, laptops, notebooks, netbooks, nettops, Mobile Internet devices (MIDs), network devices, routers, switches, cellular phones, media players, and other electronic devices having one or more processors or other instruction execution devices. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more busses and bridges (also termed bus controllers). Thus, the storage device of a given electronic device may stores code and/or data for execution on the one or more processors of that electronic device. Alternatively, one or more parts of an embodiment of the invention may be implemented using different combinations of software, firmware, and/or hardware.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus comprising:
   an execution logic that includes circuitry to execute instructions; and
   an instruction execution scheduler logic that includes circuitry coupled with the execution logic, the instruction execution scheduler logic to receive an execute at commit state update instruction, the instruction execution scheduler logic including:
   at commit state update logic to wait to schedule the execute at commit state update instruction for execution until the execute at commit state update instruction is a next instruction to commit, wherein the execution of the execute at commit state update instruction is to update internal state of a processor that is not renamed including at least one of a flag of the processor and a bit in a control register of the processor.

2. The apparatus of claim 1, wherein the instruction execution scheduler logic comprises an out-of-order instruction execution scheduler queue, the out-of-order instruction execution scheduler queue operable to schedule a younger instruction for execution before scheduling the execute at commit state update instruction for execution.

3. The apparatus of claim 2, further comprising a reorder buffer coupled with the out-of-order instruction execution scheduler queue, the reorder buffer to provide an indication to the out-of-order instruction execution scheduler queue that the execute at commit state update instruction is the next instruction to commit.

4. The apparatus of claim 1, wherein the execute at commit state update instruction comprises an execute at commit control register write instruction, which is to write the control register.

5. The apparatus of claim 1, wherein the instruction execution scheduler logic comprises a reservation station.

6. The apparatus of claim 1, wherein the execute at commit state update logic comprises:
   a plurality of sets of one or more at commit bits, each of the sets of the one or more at commit bits corresponding to a different entry in an instruction execution scheduler queue of the instruction execution scheduler logic;
   bit value adjustment logic operable, responsive to the execute at commit state update instruction, to adjust a value of a set of one or more at commit bits at an entry in the instruction execution scheduler queue corresponding to the execute at commit state update instruction to a given value;
   determination logic operable, when the set of the one or more at commit bits at the entry in the instruction execution scheduler queue corresponding to the execute at commit state update instruction has the given value, to determine whether an indication of the next instruction to commit matches an indication of the execute at commit state update instruction at the entry in the instruction execution scheduler queue corresponding to the execute at commit state update instruction.

7. The apparatus of claim 6, wherein the bit value adjustment logic comprises a decoder to decode the at commit state update instruction, and wherein the determination logic comprises a plurality of sets of determination logic each corresponding to a different entry, a set of determination logic for the entry corresponding to the execute at commit state update instruction operable to determine if a plurality of bits representing the next instruction to commit equals a plurality of bits representing the execute at commit state update instruction.

8. The apparatus of claim 6, wherein the instruction scheduler logic is operable to block issuance of the execute at commit state update instruction if the determination logic determines that the indication of the next instruction to commit does not match the indication of the execute at commit state update instruction.

9. The apparatus of claim 1, wherein the internal state comprises the flag of the processor.

10. The apparatus of claim 1, wherein the internal state comprises the bit of the control register, and wherein the bit of the control register corresponds to one of a paging table location for address translation, a segmentation data, and a memory region type.

11. A method comprising:
    receiving an execute at commit state update instruction, wherein the execute at commit state update instruction comprises an execute at commit control register write instruction;
    waiting to schedule the execute at commit state update instruction for execution until the execute at commit state update instruction is a next instruction to commit;
    scheduling the execute at commit state update instruction for execution when it is the next instruction to commit; and
    executing the execute at commit state update instruction including writing an internal control register of an instruction processing apparatus, wherein no bits of the control register are configured to be renamed.

12. The method of claim 11, further comprising after receiving the instruction, and before scheduling the instruction for execution, scheduling a younger instruction for execution, the younger instruction being younger than the execute at commit state update instruction.

13. An article of manufacture comprising:
a machine-readable storage media having stored thereon an execute at commit control register write instruction that if processed by a machine results in the machine performing operations including,
waiting to schedule the execute at commit control register write instruction for execution until the execute at commit control register write instruction is a next instruction to commit; and
scheduling the execute at commit control register write instruction for execution when it is the next instruction to commit, wherein bits of a control register to be written by the execute at commit control register write instruction are not configured to be renamed.

14. The article of manufacture of claim 13, wherein the execute at commit control register write instruction further results in the machine performing operations comprising:
scheduling a younger instruction for execution, the younger instruction being younger than the execute at commit control register write instruction, after receiving the execute at commit control register write instruction, and before scheduling the execute at commit control register write instruction for execution.

15. The article of manufacture of claim 13, wherein the execute at commit control register write instruction further results in the machine performing operations comprising:
updating internal state of the machine when the execute at commit control register write instruction commits, in which the internal state comprises the control register that is not renamed through register renaming.

16. A system comprising:
an interconnect;
a processor coupled with the interconnect, the processor including an instruction execution scheduler logic, the instruction execution scheduler logic having:
logic, responsive to an execute at commit state update instruction, to block scheduling of the execute at commit state update instruction for execution until the execute at commit state update instruction is a next instruction to commit; and
an execution unit to update internal state of the processor as a result of the execute at commit state update instruction, wherein the internal state of the processor to be updated is not renamed; and
a dynamic random access memory (DRAM) coupled with the interconnect.

17. The system of claim 16, wherein the execute at commit state update instruction comprises a control register write instruction that is operable to cause the processor to write a control register, and wherein the control register is not configured to be renamed.

18. A processor comprising:
an instruction execution scheduler to receive an internal processor state update instruction, the instruction execution scheduler to wait to schedule the internal processor state update instruction for execution until at least one of (a) the internal processor state update instruction is at retire, (b) the internal processor state update instruction has just retired, (c) the internal processor state update instruction is at complete, (d) the internal processor state update instruction has just completed, (e) after resolution of a dynamic prediction associated with the internal processor state update instruction, and (f) after receipt of a branch resolution signal associated with the internal processor state update instruction; and
an execution logic coupled with the instruction execution scheduler, the execution logic to update internal processor state of the processor in response to the internal processor state update instruction, wherein the internal processor state of the processor that is to be updated is not renamed internal processor state.

19. The processor of claim 18, wherein the internal state comprises at least one bit of a control register of the processor.

20. The processor of claim 18, wherein the internal state comprises at least a flag of the processor.

21. The processor of claim 18, wherein the instruction execution scheduler is to wait to schedule the internal processor state update instruction for execution until at least one of (a) the internal processor state update instruction is at said retire, (b) the internal processor state update instruction has just retired, (c) the internal processor state update instruction is at said complete, and (d) the internal processor state update instruction has just completed.

* * * * *